(12) United States Patent
Flachs et al.

(10) Patent No.: US 8,520,740 B2
(45) Date of Patent: Aug. 27, 2013

(54) ARITHMETIC DECODING ACCELERATION

(75) Inventors: Brian Flachs, Georgetown, TX (US); Charles R. Johns, Austin, TX (US); Michael A. Kutner, Mountain View, CA (US); Brad W. Michael, Cedar Park, TX (US); Naxin Wang, San Jose, CA (US)

(73) Assignees: International Business Machines Corporation, Armonk, NY (US); Sony Computer Entertainment Inc., Tokyo (JP)

( * ) Notice: Subject to any disclaimer, the term of this patent is extended or adjusted under 35 U.S.C. 154(b) by 405 days.

(21) Appl. No.: 12/874,564

(22) Filed: Sep. 2, 2010

(65) Prior Publication Data

US 2012/0057637 A1    Mar. 8, 2012

(51) Int. Cl.
*H04N 7/12* (2006.01)
(52) U.S. Cl.
USPC .................................................. 375/240.25
(58) Field of Classification Search
USPC .................................................. 375/240.25
See application file for complete search history.

(56) References Cited

U.S. PATENT DOCUMENTS

| | | | |
|---|---|---|---|
| 6,876,317 B2 | 4/2005 | Sankaran | |
| 7,262,721 B2 | 8/2007 | Jeon et al. | |
| 7,385,535 B2 | 6/2008 | Yang et al. | |
| 7,656,326 B2 | 2/2010 | Hussain et al. | |
| 7,684,488 B2 | 3/2010 | Marpe et al. | |
| 7,688,234 B2 | 3/2010 | Koo | |
| 2004/0260739 A1 | 12/2004 | Schumann | |
| 2008/0240234 A1 | 10/2008 | Hung et al. | |
| 2008/0246637 A1 | 10/2008 | Chen et al. | |
| 2009/0196355 A1* | 8/2009 | Kao et al. | 375/240.25 |
| 2010/0278237 A1* | 11/2010 | Yeh | 375/240.14 |

OTHER PUBLICATIONS

Marpe, Detlev, "Context-Based Adaptive Binary Arithmetic Coding (CABAC)", Research Topics—Detlev Marpe, Institut Nachrichtentechnik, Heinrich-Hertz-Institut, http://iphome.hhi.de/marpe/cabac.html, Accessed on Aug. 18, 2010, 4 pages.

Marpe, Detlev et al., "Context-Based Adaptive Binary Arithmetic Coding in the H.264/AVC Video Compression Standard", IEEE Transactions on Circuits and Systems for Video Technology, vol. 13, No. 7, Jul. 2003, pp. 620-636.

* cited by examiner

*Primary Examiner* — Jay Patel
*Assistant Examiner* — Richard Torrente
(74) *Attorney, Agent, or Firm* — Francis Lammes; Stephen J. Walder, Jr.; Matthew B. Talpis

(57) ABSTRACT

Mechanisms for performing decoding of context-adaptive binary arithmetic coding (CABAC) encoded data. The mechanisms receive, in a first single instruction multiple data (SIMD) vector register of the data processing system, CABAC encoded data of a bit stream. The CABAC encoded data includes a value to be decoded and bit stream state information. The mechanisms receive, in a second SIMD vector register of the data processing system, CABAC decoder context information. The mechanisms process the value, the bit stream state information, and the CABAC decoder context information in a non-recursive manner to generate a decoded value, updated bit stream state information, and updated CABAC decoder context information. The mechanisms store, in a third SIMD vector register, a result vector that combines the decoded value, updated bit stream state information, and updated CABAC decoder context information. The mechanisms use the decoded value to generate a video output on the data processing system.

21 Claims, 6 Drawing Sheets

FIG. 5A

```
        typedef struct
        {
        // prefered slot
        uint bit;
        // slot 1
        uint handler;
        // slot 2
510     uchar outdata;
        uchar range;
        bool mps;
        6bits state;
        bool bypass;
        3bits unused;
        5bits bitsleft;
        // slot 3
        uint value;
        } result;
        result cabac_decode_bit(result stream, result context)
        {
        if (bitsleft<9)
        {
520     uint result.bit = pc; // note that handler will return to this instruction
        goto stream.handler;
        }
        if (! context.bypass)
        {
        uchar lps = lps (context.state,stream.range);
        9bit range = stream.range - lps;
        bool usemps = stream.value < (range<<16);
        bool rlq = range < 256;
        3bits renorm = usemps ? rlq : clz (lps);
        bool bit = usemps ? context.mps : ! context.mps;
        uint value = stream.value - (usemps ? 0 : range<<16);
530     9bit result.range = usemps ? (range << renorm) & 0x1ff : (lps<<renorm);
        5bit result.bitsleft = stream.bitsleft-renorm;
        bool result.mps = context.state ? !context.mps : bit;
        6bits result.state = usemps ? inc(context.state) : nextstate(context.state);
        uchar result.outdata = (stream.outdata<<1)|bit;
        uchar result.bit = bit ? 0xffffffff : 0x00000000;
        uint result.value = value<<renorm;
        bool result.bypass = context.bypass;
        uint result.handler = stream.handler;
        }
```

```
else
{
bool usemps = stream.value < (stream.range<<16);
bool bit = ! usemps;
3bits renorm = 1;
uint value = stream.value - (usemps ? 0 : range<<16);
9bit result.range = stream.range;
5bit result.bitsleft = stream.bitsleft-renorm;
bool result.mps = context.mps;
6bits result.state = context.state;
uchar result.outdata = (stream.outdata<<1) | bit;
uchar result.bit = bit ? 0xffffffff : 0x00000000;
uint result.value = value<<renorm;
bool result.bypass = context.bypass;
uint result.handler = stream.handler;
}
return(result);
}
```

ARITHMETIC DECODING ACCELERATION

BACKGROUND

The present application relates generally to an improved data processing apparatus and method and more specifically to mechanisms for accelerating arithmetic decoding, such as in context-based adaptive binary arithmetic coding (CABAC).

In today's society, data networks are increasingly used as a source of multimedia content that is downloaded or streamed from server computing devices to client computing devices, provided over wireless communications to portable computing devices, across fiber optic connections to television receivers, and the like. The ever increasing demand for multimedia content over data networks has greatly outpaced the increases in bandwidth of the data communication connections over which this multimedia content is provided. Thus, it becomes increasingly more important for ways to be devised to reduce the size of the multimedia content.

One way of reducing the size of this multimedia content is to use entropy encoding mechanisms, such as Huffman coding, arithmetic coding, adaptive arithmetic coding, and the like. Entropy encoding is a coding scheme that involves assigning codes to symbols in the multimedia content so as to match code lengths with the probabilities of the symbols. Typically, entropy encoders are used to compress data by replacing symbols, represented by equal length code segments, with symbols represented by codes proportional to the negative logarithm of the probability. As a result, the most common symbols use the shortest codes. Huffman coding is one type of entropy encoding in which an alphabet is mapped to a representation of that alphabet composed of strings of variable size so that symbols that have a higher probability of occurring have a smaller representation than those that occur less often. An arithmetic encoder takes a string of symbols as input and produces a rational number in the interval [0, 1] as output. Adaptive arithmetic encoders/decoders generally consume a stream and decode symbols using one or more probability estimates for the probability of the next symbol with the probability being adjusted according to the actual symbol decoded.

Various standards have been developed to improve the visual quality of multimedia content while providing overall smaller data size multimedia files. One of these standards, the H.264 specification (also known as the ISO Motion Picture Experts Group (MPEG)-4 part 10), is a high compression digital video codec standard. An H.264 compliant codec can encode video with approximately three times fewer bits than comparable MPEG-2 encoders while retaining similar video quality. The H.264 specification provides for two types of entropy encoding processes, including context-adaptive binary arithmetic coding (CABAC) and context-adaptive variable length coding (CAVLC). With regard to CABAC, the CABAC coder has multiple probability modes for different contexts, where a "context" is a probability model for the multimedia content that is dynamically updated and contains the probability that a particular symbol is likely to occur based on the number of previous instances of the symbol in the multimedia content. The CABAC coder first converts all non-binary symbols to binary and then, for each bit, the CABAC coder selects which probability model to use. The CABAC coder then uses information from nearby elements to optimize the probability estimate. Arithmetic coding is then applied to compress the data. More information regarding CABAC and CAVLC may be found in Marpe et al., "Context-Based Adaptive Binary Arithmetic Coding in the H.264/AVC Video Compression Standard," IEEE Transactions on Circuits and Systems for Video Technology, vol. 13, no. 7, July 1303, pages 620-636.

CABAC decoding operations are typically sequential in nature, requiring extensive computations to calculate various parameters including range, offset, and context information. Currently, CABAC decoding is either done by software running on a central processing unit, a dedicated special purpose processor, or specially designed CABAC decoder hardware unit which sends the resulting symbol stream either to a processor or to another hardware unit concerned with the next step of the H.264 decoding operation. The operation count suffered by central processing unit, the dedicated special purpose processor, or CABAC decoder is fairly costly and does not take advantage of any parallelism that may be achievable in the CABAC decoding process. Thus, CABAC decoding tends to be a source of inefficiency in the processing of multimedia content due to the extra overhead of processor cycles, consumed resources, and the like, required to perform the CABAC decoding.

SUMMARY

In one illustrative embodiment, a method, in a data processing system, is provided for performing decoding of context-adaptive binary arithmetic coding (CABAC) encoded data. The method comprises receiving, in a first single instruction multiple data (SIMD) vector register of the data processing system, CABAC encoded data of a bit stream. The CABAC encoded data comprises a value to be decoded and bit stream state information. The method further comprises receiving, in a second SIMD vector register of the data processing system, CABAC decoder context information. Moreover, the method comprises processing, by a processor, the value, the bit stream state information, and the CABAC decoder context information in a non-recursive manner to generate a decoded value, updated bit stream state information, and updated CABAC decoder context information. Furthermore, the method comprises storing, in a third SIMD vector register, a result vector that combines the decoded value, updated bit stream state information, and updated CABAC decoder context information. In addition, the method comprises using the decoded value to generate a video output on the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B illustrate an example of pseudo code for defining the operation of the decode_bit instruction in accordance with one illustrative embodiment; and FIG. 6 is an example circuit diagram of a CABAC engine which implements the methodology of the example pseudo code of FIGS. 4A and 4B in accordance with one illustrative embodiment.

DETAILED DESCRIPTION

Figure 1:
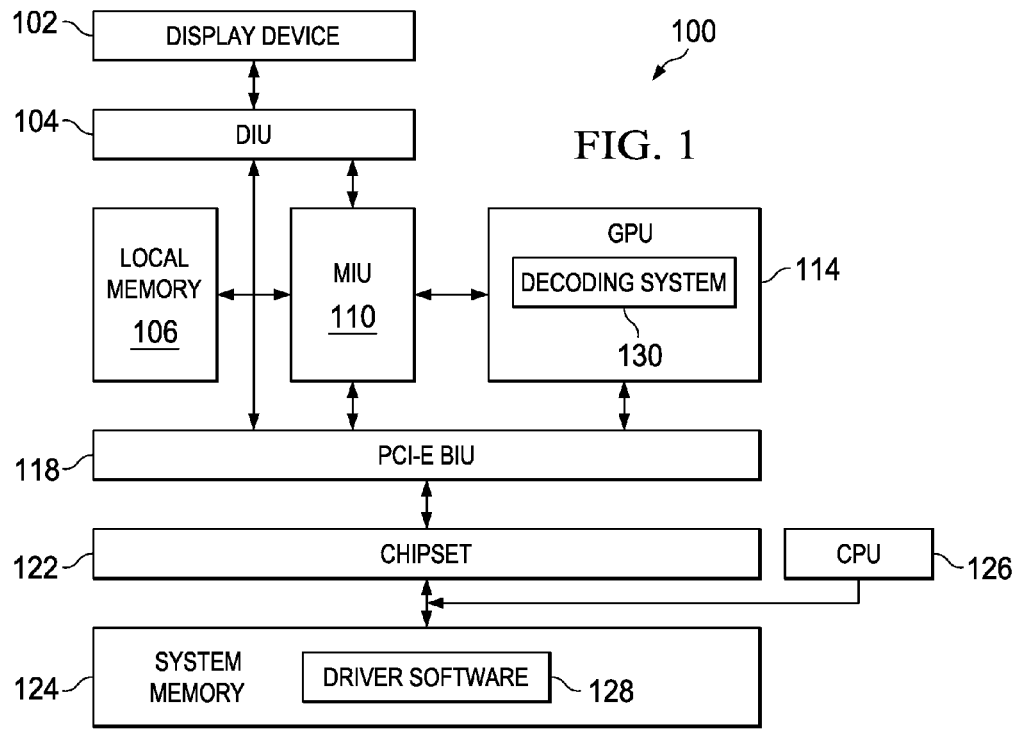
FIG. 1 is a block diagram of an embodiment of a graphics processor system 100 in which embodiments of decoding systems and methods are implemented.

The illustrative embodiments provide a mechanism for accelerating arithmetic decoding, such as in context-based adaptive binary arithmetic coding (CABAC). The mechanisms of the illustrative embodiments provides a code kernel, which may be provided as part of the operating system or the like, operating between applications and the underlying hardware of the system, that performs efficient and parallelizable single instruction multiple data (SIMD) based CABAC decoding. Alternatively, the mechanisms of the illustrative embodiments may be implemented as a code kernel provided in software or firmware of a dedicated special purpose processor, separate CABAC decoder hardware unit, or the like. The code kernel provides instructions to perform the operations of loading a CABAC decoder context, decoding a bit of the multimedia content input data stream, and then storing the CABAC decode context. The actual operations for decoding the bit of the multimedia content input data stream are configured for parallel execution using SIMD registers in a SIMD processor architecture, as will be described in greater detail hereafter. As a result, the CABAC decoding operation may be performed in a parallel manner with minimum recursiveness, such that it is performed more quickly resulting in faster overall processing of multimedia content.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Disclosed herein is a context-adaptive binary arithmetic coding (CABAC) decoding mechanism (hereafter referred to as a decoding system). In one embodiment, a decoding system is embedded in one or more execution units of a programmable, multithreaded, parallel computational core of a graphics processing unit (GPU). The decoding system described herein is capable of decoding bit streams according to the well-known International Telecommunication Union Telecommunication Standardization Sector (ITU-T) H.264 standard. Various illustrative embodiments of the decoding system operate based on the execution of one or more instruction sets received (e.g., via well known mechanisms such as pre-loading or through cache misses) from a GPU frame buffer memory or memory corresponding to a host processor (e.g., host central processing unit (CPU)). It should be noted that while the decoding system will be described in terms of being part of a graphics processing unit (GPU), the illustrative embodiments are not limited to such. Rather, the decoding system may be provided as part of the central processing unit, a service processor, another type of co-processor, as a separate dedicated hardware unit, or the like, without departing from the spirit and scope of the illustrative embodiments.

FIG. 1 is a block diagram of an embodiment of a graphics processor system 100 in which embodiments of decoding systems and methods are implemented. In some implementations, the graphics processor system 100 may be configured as a computer system. The graphics processor system 100 may comprise a display device 102 driven by a display interface unit (DIU) 104 and local memory 106 (e.g., which may comprise a display buffer, frame buffer, texture buffer, command buffer, etc.). Local memory 106 may also be referred to interchangeably herein as a frame buffer or storage unit. Local memory 106 is coupled to a graphics processing unit (GPU) 114 through one or more memory interface units (MIU) 110. The MIU 110, GPU 114, and DIU 104 are coupled in one embodiment to a peripheral component interconnect express (PCIE) compatible bus interface unit (BIU) 118. In one embodiment, the BIU 118 may employ a graphics address remapping table (GART), although other memory mapping mechanisms may be employed. The GPU 114 includes the decoding system 130, as described below. Although shown as a component of the GPU 114, in some embodiments, the decoding system 130 may include one or more additional components of the graphics processor system 100 that are shown, or different components not explicitly shown in FIG. 1.

The BIU 118 is coupled to a chipset 122 (e.g., north bridge chipset) or switch. The chipset 122 comprises interface electronics to strengthen signals from a central processing unit (CPU) 126 (also referred to herein as a host processor) and to separate signals to and from a system memory 124 from those signals going to and from input/output (I/O) devices (not shown). Although a PCIE bus protocol is described, other manners of connection and/or communication between the host processor and the GPU 114 may be implemented in some embodiments (e.g., PCI, proprietary high-speed bus, etc.). The system memory 124 also comprises driver software 128, which communicates instruction sets or commands through the use of the CPU 126 to registers in the GPU 114.

Additional graphics processing units may be employed in some embodiments, coupled for instance to the components shown in FIG. 1 through the chipset 122 via a PCIE bus protocol among others. In one embodiment, the graphics processor system 100 may embody all of the components shown in FIG. 1, or fewer and/or different components than those shown in FIG. 1. Further, in some embodiments, additional components may be used, such as a south bridge chipset coupled to the chipset 122.

The elements shown in FIG. 1 may be implemented in many different types of data processing systems that utilize a parallel processing architecture. In one illustrative embodiment, the mechanisms of the illustrative embodiments may be implemented in a CABAC decoding system, such as decoding system 130, that is part of a single instruction multiple data (SIMD) processor architecture. The particular processor making use of this SIMD processor architecture may be a graphics processing unit (GPU) such as shown in FIG. 1 above, a central processing unit (CPU), another type of co-processor or special purpose processor in a multi-processor system, a dedicated hardware unit that operates in concert with one or more other processors, or the like, for example. An example of one type of SIMD processor architecture is shown in FIG. 2.

Figure 2:
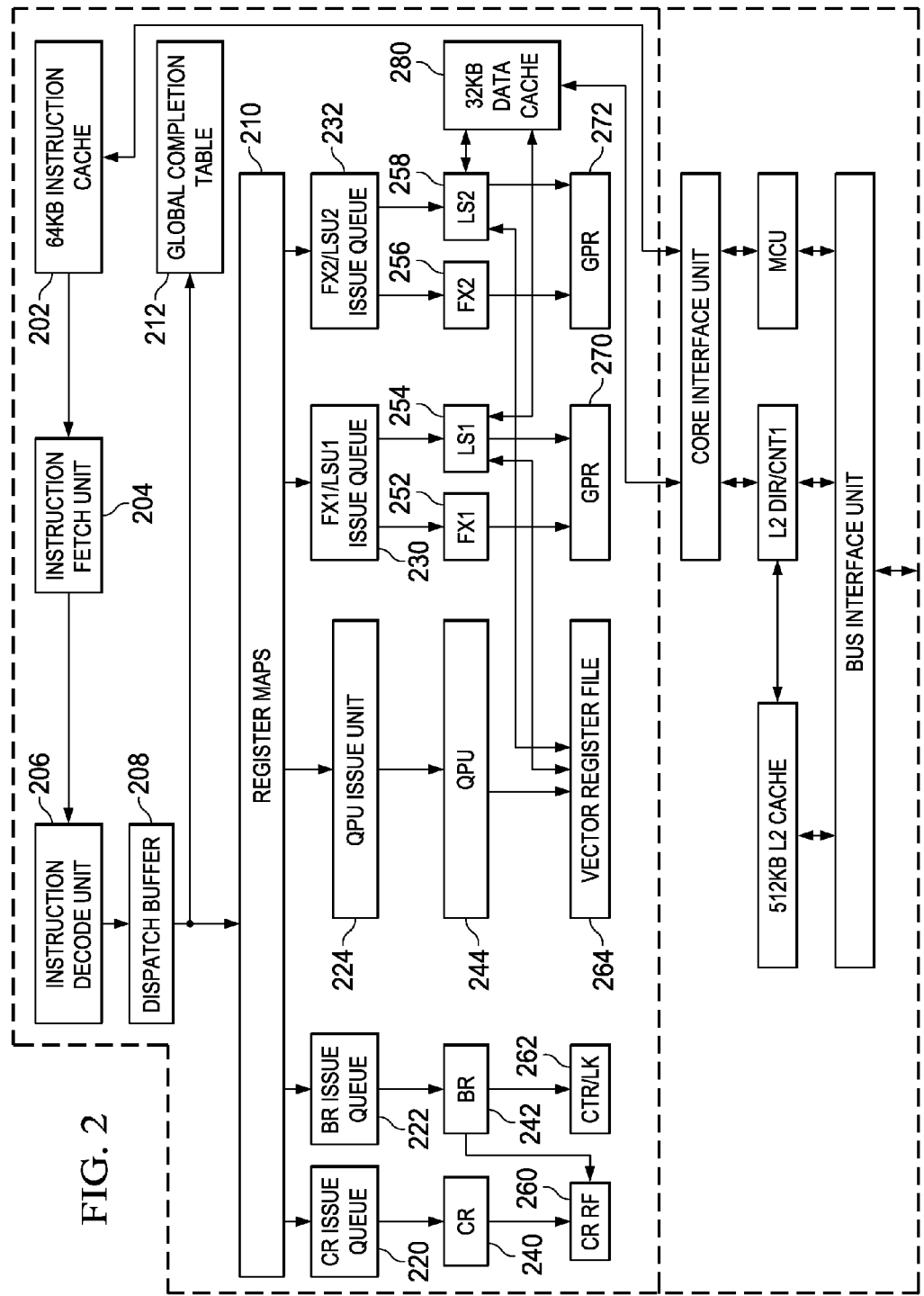
FIG. 2 is a block diagram of a processor architecture in which aspects of the illustrative embodiments may be implemented.

FIG. 2 is a block diagram of a processor architecture in which aspects of the illustrative embodiments may be implemented. As shown in FIG. 2, the processor architecture includes an instruction cache 202, an instruction fetch unit 204, an instruction decode unit 206, and a dispatch buffer 208. Instructions are fetched by the instruction fetch unit 204 from the instruction cache 202 and provided to the instruction decode unit 206. The instruction decode unit 206 decodes the instruction and provides the decoded instruction to the dispatch buffer 208. The output of the decode unit 206 is provided to both the register maps 210 and the global completion table 212. The register maps 210 map to one or more of the general purpose registers (GPRs), floating point registers (FPRs), vector register files (VRF), and the like. The instructions are then provided to an appropriate one of the issue queues 220-232 depending upon the instruction type as determined through the decoding and mapping of the instruction decode unit 206 and register maps 210. The issue queues 220-232 provide inputs to various ones of execution units 240-258. The outputs of the execution units 240-258 go to various ones of the register files 260-272. Data for use with the instructions may be obtained via the data cache 280.

As shown in FIG. 2, the issue unit 224 is a quad-processing execution unit (QPU) issue unit 224, the execution unit 244 is a quad-processing execution unit (QPU) 244, and the register file 264 is a quad-vector register file (QRF) 264. Because the quad-processing unit (QPU) can execute up to 4 data elements concurrently with a single instruction, i.e. it is a SIMD execution unit, this architecture not only reduces the resource usage, area usage, and power usage, while simplifying the design of the processor, but the modified architecture also increases performance of the processor. The QPU 244 receives vector inputs from SIMD vector registers in the vector register file 264, operates on them, and then writes back results to the vector register file 264. The SIMD vector registers that provide the vector inputs to the QPU 244 may each comprise a four slot vector register, where a slot 0 may be specified as a preferred slot with each slot storing a vector value for processing. The total size across all slots of the SIMD vector register may be, in one illustrative embodiment, 128 bits. This SIMD processor architecture shown in FIG. 2 may be used to implement the CABAC decoding system described hereafter.

The CABAC decoding system 130 in FIG. 1 utilizes single instruction multiple data (SIMD) vector registers to perform the CABAC operations and utilizes an efficient set of instructions as set forth hereafter to implement the CABAC operations in a parallelizable manner. These SIMD vector registers, in one illustrative embodiment, may be 128 bit SIMD vector registers, for example. Moreover, the CABAC decoding system 130 accepts inputs from SIMD vector registers having a same format, i.e. both SIMD vector registers providing inputs to the CABAC decoding system 130 utilize a same format of data with the result of the CABAC decoding system 130 being output to an output SIMD vector register having a same format as that of the input SIMD vector registers. This greatly simplifies the implementation of the CABAC algorithm in that complex reordering of data in registers is not necessary.

Moreover, with the mechanisms of the illustrative embodiments, the state of the CABAC decoding does not need to be maintained in special purpose state registers of a hardware CABAC decoder, which typically would be very limited in number and in size. To the contrary, all storage of the state of the CABAC decoding may be performed using software mechanisms and general purpose registers of the system which can be virtualized using virtual memory mechanisms, thereby providing larger storage capacity and the ability to store state information for a plurality of different video streams. That is, using a single CABAC decoder mechanism according to the illustrative embodiments, a plurality of video streams can be decoded in parallel at approximately a same time using different sets of general purpose registers to store the corresponding context and other state information for the streams. Moreover, because multiple streams may be decoded at approximately the same time, intermixing of decoding of one video stream with decoding of one or more other video streams is made possible using the mechanisms of the illustrative embodiments.

In order to better understand the improvements made by the mechanisms of the illustrative embodiments, it is first beneficial to have a brief overview of the CABAC decoding process. In general, an H.264 CABAC decoding process can be described as comprising the parsing of an encoded bit stream for a first syntax element, initialization of context variables and the decoding engine for the first syntax element, and binarization. Then, for the decoding of each binary symbol, or "bin," the process comprises obtaining a context model and the decoding of the bins of a respective syntax element until a match to a meaningful codeword is obtained. The CABAC decoding system 130 decodes syntax elements, where each syntax element may represent quantized coefficients, motion vectors, and/or prediction modes, among other parameters pertaining to a macroblock or macroblocks used to represent a particular field or frame of an image or video. Each syntax element may comprise a series of one or more binary symbols, or "bins," with each binary symbol decoded as a zero (0) or one (1) value. The decoding system 130 controls the output bit length according to the occurrence probability of the input binary symbols.

As is known, a CABAC encoder provides a highly efficient coding scheme when it is known that certain symbols (referred to as dominant symbols) are more likely to occur than other symbols. Such dominant symbols may be encoded with small bit/symbol ratios. The encoder continually updates the frequency statistics of incoming data and adaptively adjusts the arithmetic and context models of the coding algorithm. The binary symbol with the higher probability is called the most probable symbol (MPS), and the other symbol is the least probable symbol (LPS). A binary symbol has associated with it a context model, with each context model corresponding to the LPS probability and a most probable symbol (MPS) value.

To decode each binary symbol, the decoding system 130 determines or receives a corresponding range, offset, and context model. The context model is selected from a plurality of possible context models based on the type of symbol and the context of decisions made for spatial neighbors (e.g., either a current macroblock or adjacent macroblocks subject to previous decoding). A context identifier can be determined through the context model and used to obtain the MPS value and the current state of the decoding engine for use in the decoding process. The range indicates an interval that is narrowed after each bin decoding.

The interval is divided into two sub-ranges corresponding respectively to the MPS value and the LPS probability. The LPS sub-range is calculated by multiplying the range and the LPS probability specified in a given context model. The MPS sub-range is calculated by subtracting the LPS sub-range from the range. The offset is a criteria for deciding a decoded bin, and is typically initialized by taking the first nine (9) bits from the encoded bit stream. For a given binary symbol decoding and context model, if the offset is less than the MPS sub-range, the bin is the MPS value and the range to be used in the next decoding is set to the MPS sub-range. Otherwise, the bin is determined to be LPS, the inversion of the MPS value contained in the associated context model, and the next range is set to the LPS sub-range. The result of the decoding process is a sequence of decoded bins, which is evaluated to determine whether the sequence matches with a meaningful codeword.

Given the general overview of the operations of the decoding system 130 as it relates to CABAC decoding, the following description sets forth an explanation of the various components of the decoding system 130 in the context of the CABAC decoding process, with the understanding that variations consistent with accepted practices of the standard are contemplated. It should be appreciated by one having ordinary skill in the art in the context of this disclosure that many of the terms used below can be found in the H.264 specification, and hence explanation of much of the same is omitted for brevity except where helpful to the understanding of the various processes and/or components described below.

The decoding system 130 uses a software kernel that essentially performs a three step loop that continues until all of data in a bit stream is processed by the decoding system 130 or another exit condition, such as an error or the like, is encountered. The three step loop comprises loading the context for the bit in the next bit stream, decoding the bit in the bit stream according the CABAC decoding process as modified by the illustrative embodiments, as described hereafter, and storing the context for use in the CABAC decoding of the next bit in the bit stream.

With the mechanisms of the illustrative embodiments, the CABAC decoding process is performed using a newly defined decode_bit instruction that uses 2 operands. From the first operand, a vector of information describing the context of the bit to be decoded is obtained, e.g., the handler information, range information, number of bits left, and value information, as described hereafter. From the second operand, a vector of information describing the state of the bit stream, e.g., MPS information, state information, and bypass information, as described hereafter, is obtained. The decode_bit instruction returns a single operand comprising a vector combining the next state of both the context and the bit stream.

These input and output vectors are all stored in vector registers, such as single instruction multiple data (SIMD) vector registers of a SIMD processor architecture. These SIMD vector registers all have a same data format and thus, the input vector registers have a same data format with each other and the output vector register has a same data format as the two input vector registers. In one illustrative embodiment, these vectors can be stored in 128 bits of the SIMD vector registers. The decode_bit instruction further may generate an interrupt, or "trap-out", to a bit stream service handler when a bit stream buffer is exhausted so that the bit stream buffer can be refilled.

Figure 3:
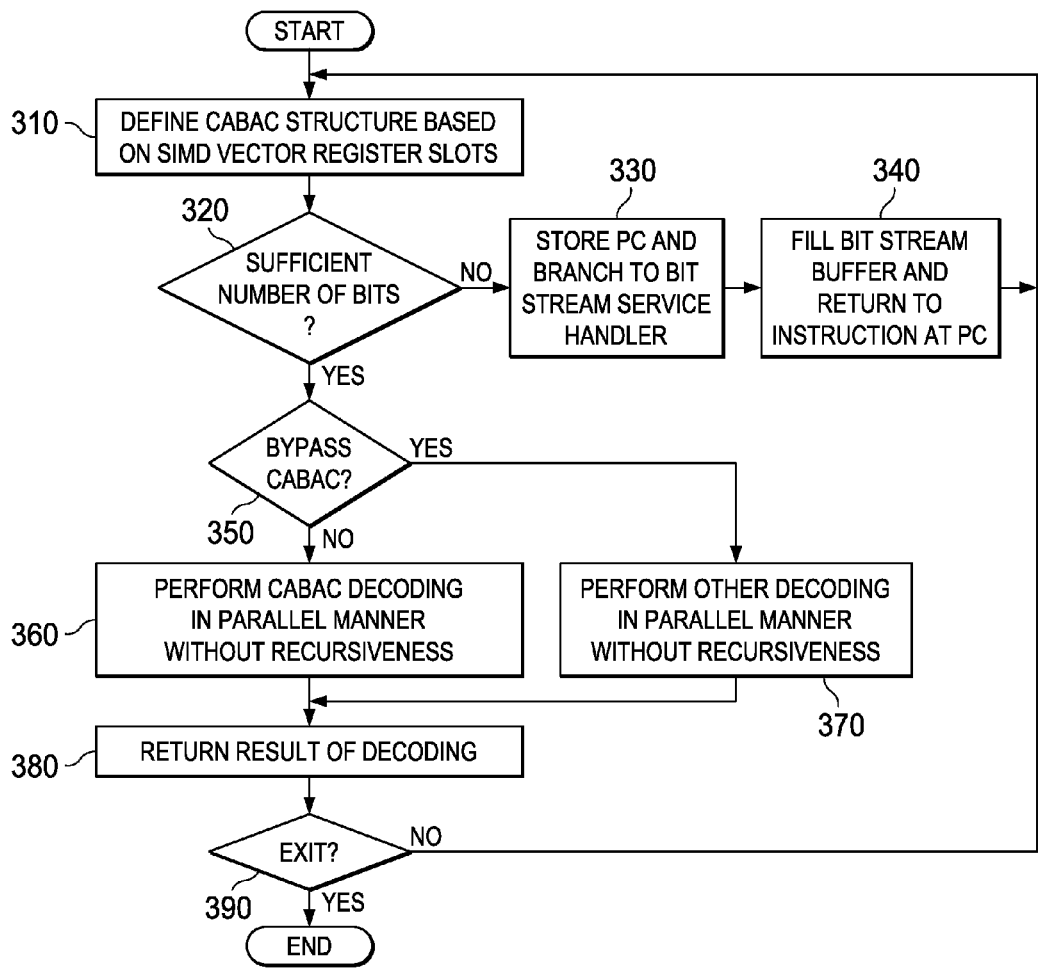
FIG. 3 is a flowchart outlining an example operation that may be performed by the processing of a decode_bit instruction by a CABAC decoding system in accordance with one illustrative embodiment.

FIG. 3 is a flowchart outlining an example operation that may be performed by the processing of a decode_bit instruction by a CABAC decoding system in accordance with one illustrative embodiment. For example, one or more arithmetic logic units (ALUs) of the CABAC decoding system 130 in FIG. 1 may perform the various calculations and operations necessary to generate the results of the CABAC decoding process. A multiplexer, or the like, of the CABAC decoding system may be used to determine whether to bypass CABAC decoding, for example, as described hereafter, using a bypass value as a selector input. Other logic may be provided in the CABAC decoder for implementing the operations outlined in FIG. 3 without departing from the spirit and scope of the illustrative embodiments.

Figure 4:
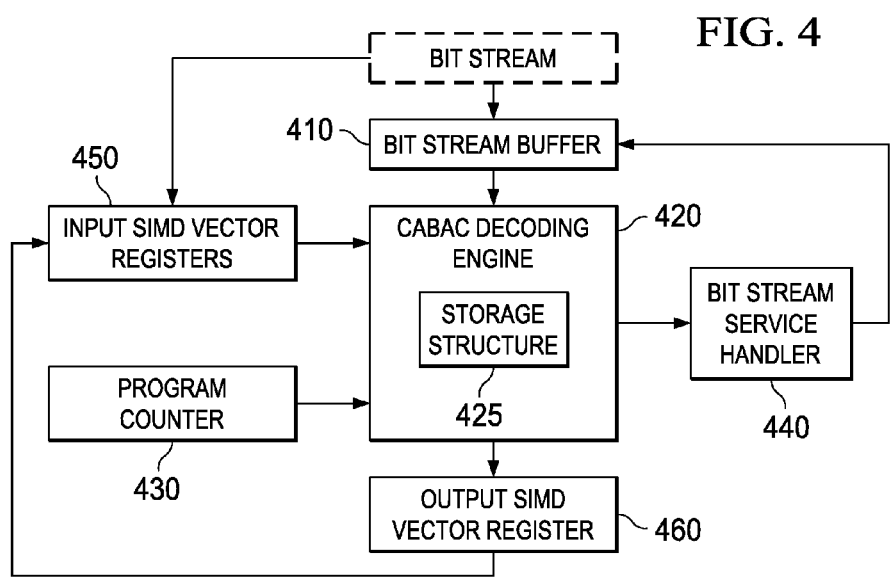
FIG. 4 is a block diagram of the primary operational elements of a CABAC decoding mechanism in accordance with one illustrative embodiment.

FIG. 3 will be described in relation to FIG. 4 which shows a block diagram of the primary operational elements of a CABAC decoding mechanism in accordance with one illustrative embodiment. FIG. 4 is only an example and is not intended to state or imply any limitation with regard to the configuration or composition of elements used to implement the mechanisms of the illustrative embodiments. Many modifications to the configuration and composition of the elements shown in FIG. 4 may be made without departing from the spirit and scope of the illustrative embodiments.

As shown in FIG. 3, a structure is defined (step 310) based on the SIMD vector register slots, to represent a syntax element of a CABAC decoding mechanism. In one illustrative embodiment, for example, a preferred slot, e.g., slot 0, of the SIMD vector register is assigned to store an unsigned 32 bit integer "bit" or "outbit" which represents a single bit output of the decode bit operation which can be replicated in the result to fill the width of a convenient integer for the remainder of the processor architecture. A next slot, i.e. slot 1, stores an unsigned integer "handler" that represents a pointer to a handler routine that is used to refill the stream of data coming into the CABAC decoding mechanism. That is, the stream value holds a certain amount of information from the video stream. As it empties, it must be refilled from the data source, e.g., file, network, etc. The handler routine is used to refill this stream value.

A next slot, i.e. slot 2, stores unsigned character values for "outdata" which represents an accumulation of the current decode bit plus a predetermined amount of prior decode bits, e.g., 7 previously decoded bits to generate an 8 bit result. The width of the "outdata" value field is matched to a convenient integer in the processor architecture. It is provided to allow the software to store uncompressed data in larger chunks than a bit, for efficiency purposes.

The "range" value is a piece of the current stream state that represents the range of the currently predicted symbol. The Boolean value for MPS represents the most probable next symbol and the 6 bit "state" represents a value from 0 to 1. A Boolean value for "bypass" represents whether or not the decoding should bypass the adaptive probability model for the MPS. In the bypass model, i.e. the non-adaptive probability model, the probability of a symbol is 50% as opposed to the adaptive probability determination in the adaptive probability model. A last slot, i.e. slot 3, of the vector register stores an unsigned integer "value" which represents the portion of the input stream that is the subject of the current decoding operation.

The structure shown in FIG. 3 is representative of both the input to the CABAC decoder mechanism and the output of the CABAC decoder mechanism. That is, two inputs may be provided to the CABAC decoder mechanism, one for the video stream input data and one for the context input data, with a single output being generated that has the same format as the structure shown in FIG. 3 but which combines the information obtained from the two inputs, as will be discussed in greater detail hereafter with regard to FIG. 6. The result value represents the next value for both the stream and the context. For example, the pseudo-code for decoding a bit of a stream is of the type:

Load context from context table entry i;
Result=decode_bit(stream, context);
Store result into context table entry i;
Stream=result Thus, with the mechanisms of the illustrative embodiments, the inputs to the CABAC decoder mechanism and the output from the CABAC decoder mechanism are formatted the same. The fields of the inputs and output do not overlap and thus, are easily parsed. Moreover, these inputs and output may be stored in general purpose registers of the system rather than a much smaller set of special purpose registers used specifically for CABAC decoding, as is typical in known hardware based approaches to CABAC decoders. As a result, a larger storage capacity is made possible for the CABAC decoding and furthermore, storing of state information for a plurality of different video streams is also made possible. Thus, using a single CABAC decoder mechanism according to the illustrative embodiments, a plurality of video streams can be decoded in parallel at approximately a same time using different sets of general purpose registers to store the corresponding context and other state information for the streams. Moreover, because multiple streams may be decoded at approximately the same time, intermixing of decoding of one video stream with decoding of one or more other video streams is made possible using the mechanisms of the illustrative embodiments.

Having defined this structure, the decode_bit instruction passes with it, an identifier of the input SIMD vector registers 450 storing the state and context information to be used by the CABAC decoding operations of the illustrative embodiments when decoding bits from the bit stream buffer 410 for the current syntax element being decoded, i.e. the stream state SIMD vector register and the context SIMD vector register. The information stored in these SIMD vector registers represents the state and context of a particular syntax element for CABAC decoding.

The processing of the decode_bit instruction causes a determination to be made by the CABAC engine 420 as to whether there are sufficient bits in the bit stream buffer 410 to perform the CABAC processing (step 320). As mentioned above, 9 bits are generally required to perform the CABAC processing. Thus, step 320 may generally check to determine if there are at least 9 bits available in the bit stream buffer 410. If there is not a sufficient number of bits in the bit stream buffer 410, then the program counter (pc) 430 is stored in a storage structure 425 of the CABAC engine 420 and the execution branches to a bit stream service handler 440 to fill the bit stream buffer 410 so that there is a sufficient number of bits in the bit stream buffer 410 (step 330). Once the bit stream service handler 440 fills the bit stream buffer 410, then the operation returns to the instruction corresponding to the stored program counter value in the storage structure 425 (step 340), and the operation returns to step 320.

If there is a sufficient number of bits available in the bit stream buffer 410 (step 320), then a determination is made as to whether CABAC decoding should be bypassed based on a bypass field of the context information that is associated with the syntax element to be decoded (step 350). As is generally known in the art, bypassing in the CABAC encoding algorithm involves selecting an option to perform simplified coding without the usage of explicitly assigned context models. In the present case, when a syntax element is to be decoded, the syntax element will have an associated bypass flag value indicating whether CABAC encoding was used or was bypassed during the encoding of the syntax element in the bit stream. Based on this bypass flag value, the CABAC decoding engine 420 will known whether to use CABAC decoding or a more simplified decoding algorithm, corresponding to the manner by which the syntax element was encoded.

If the CABAC decoding should not be bypassed, then the CABAC decoding is performed by the CABAC decoding engine 420 in a parallel manner without recursiveness, i.e. without having to rerun or re-execute the CABAC decoding or portions of the CABAC decoding such as in the case of programmatic loops, "if" clauses, and the like (step 360). The CABAC decoding of the syntax element processes the stream state and context information from the two input SIMD vector registers 450 and combines the processed stream state and context information into resulting syntax element.

If the CABAC decoding should be bypassed, then other more simplified decoding is performed in a parallel manner without recursiveness (step 370). That is, the bypass mode means that there is not an adaptive probability model for the bit sequence in the context. Thus, the probability that a next value will be the same as a current value is assumed to be 50%. For the CABAC decoding there are several hundred different kinds of data, each data type is decoded in its own context. Some contexts make use of adaptive probability estimation to improve compression and some are bypass contexts.

A result of the decoding is returned via the output SIMD vector register 460 (step 380). This result includes the decoded value which may be used to generate the original encoded content, e.g., video data, image data, audio data, or the like, and the updated syntax element which may be used to predict the context model for the next set of bits to be decoded. That is, the results stored in the output SIMD vector register 460 may be used as an input SIMD vector register 450, such as the context input SIMD vector register 450.

A determination is made as to whether the entire bit stream has been processed or if another exit condition has occurred (step 390). If so, the operation terminates. Otherwise, the operation returns to step 310 where the next syntax element, corresponding to another set of bits in the bit stream, is processed.

Thus, with the mechanisms of the illustrative embodiments, the CABAC decoding can be performed using SIMD vector registers having a same or consistent data format both for the input vector registers and the output vector registers. This simplifies the CABAC decoder logic since complex logic for accommodating mismatches between data formats become unnecessary. Moreover, the actual operations performed by the CABAC decoding logic can be performed in a parallel manner without recursiveness, thereby increasing the speed at which these operations can be performed.

Ultimately, the mechanisms of the illustrative embodiment provide a small pipeline-able operation that can be added to a processor or dedicated service processor instruction set that can accelerate adaptive arithmetic decoding but leaves the context policies and flow control under the control of software. In particular, the software is responsible for controlling the order of the contexts within a stream and provides the context to the decode_bit instruction. Known hardware based CABAC decoders put the context table information in the hardware.

Furthermore, the pipeline-able operation allows the software to operate several CABAC decoders simultaneously on separate input video streams by using different context tables and different stream states. Other solutions would require multiple hardware state machines, i.e. one for every video stream, which increases complexity and cost with regard to a hardware CABAC decoder system. As a result, known CABAC decoders typically are limited to decoding one video stream at a time.

This small pipeline-able operation of the illustrative embodiments comprises the operations of loading the context information for the bit stream, decoding a portion of the bit stream, and then storing the updated context of the bit stream. The loading of the context information comprises loading the information into the context input SIMD vector register 450. The storing of the context information comprises the output of the CABAC decoding engine 420 being stored in the output SIMD vector register 460. The decoding of the portion of the bit stream comprises the operation outlined in FIG. 3.

FIGS. 5A and 5B illustrate an example of pseudo code for defining the operation of the decode_bit instruction in accordance with one illustrative embodiment. The pseudo code shown in FIGS. 5A and 5B may be executed on or in a central processing unit, dedicated service processor, special purpose hardware device, or the like. For example, the pseudo-code, or some equivalent of the pseudo code shown in FIGS. 5A and 5B may be executed on the CABAC decoding engine 420 in FIG. 4, which may itself be a separate hardware device, a processor, such as the GPU 114 in FIG. 1, or the like.

As shown in FIGS. 5A and 5B, a first portion 510 of the pseudo code is used for defining a structure based on the SIMD vector slots. This first portion assigns a bit value to slot 0, handler value to slot 1, outdata, range, mps, state, and bypass values to slot 2, and a value to slot 3. The bitsleft value is part of the stream state and is shown in FIGS. 5A and 5B refers to a value indicative of the number of bits left in the value field. A second portion 520 of the pseudo code determines if there is sufficient number of bits in the bit stream buffer or not. A third portion 530 of the pseudo code determines if the CABAC decoding should be bypassed, and if not, performs the CABAC decoding. A fourth portion 440 performs the simplified decoding in the event that CABAC decoding should be bypassed.

The third portion 530 of the pseudo code performs the CABAC decoding based on the defines structure specified in the first portion 510 which is implemented in the input and output SIMD vector registers. As can be seen from FIG. 5, the third portion 530 operates without recursiveness and thus, can be executed very quickly rather than using recursive techniques as is done by known CABAC algorithms. The CABAC decoding decodes the value and furthermore updates the context of the CABAC decoding engine based on the decoding of the value and combines the updated context with the stream state information to generate the updated context input SIMD vector register vector for use as an input for decoding a next portion of the bit stream.

The overall functionality performed by the third portion 530 corresponds to an implementation of a CABAC algorithm for contexts that utilize the adaptive probability model. The manner by which this third portion 530 is implemented differs from known hardware based CABAC mechanisms in that the functionality is implemented though the use of general purpose SIMD vector registers having a same data format in the slots of the vector registers and using non-recursive instructions in the body of the third portion 530 so that the functionality can be performed quickly, in a simplified manner, and with operations being able to be performed in parallel, was not known prior to the present invention.

FIGS. 5A and 5B illustrate a software illustrative embodiment of a CABAC decoding engine in accordance with one illustrative embodiment, however the present invention is not limited to only software embodiments. To the contrary, the illustrative embodiments of the present invention may include software embodiments, hardware embodiments, or any combination of software and hardware embodiments. For example, in order to make the operation of the CABAC decoding mechanisms as fast as possible, in some illustrative embodiments, the operations shown in pseudo code of FIGS. 5A and 5B may be implemented as hardware logic in a hardware device, such as a dedicated service processor or separate hardware device from the central processing unit of the data processing system or computing device in which the CABAC decoding mechanisms are implemented.

Figure 6:
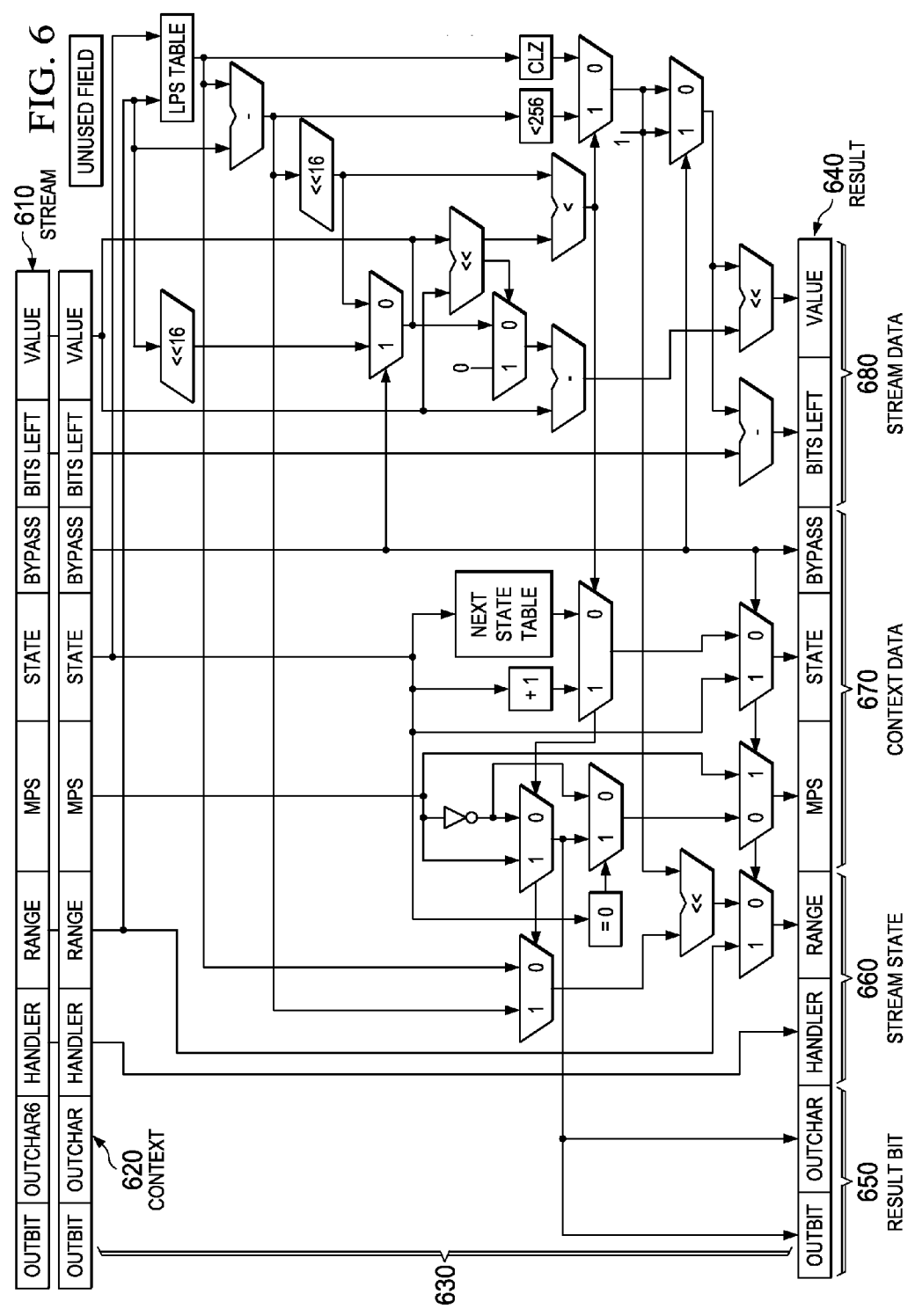

FIG. 6 is an example circuit diagram of a CABAC device which implements the methodology of the example pseudo code of FIGS. 5A and 5B in accordance with one illustrative embodiment. As shown in FIG. 6, a first input SIMD vector register 610 provides bit stream state information to the CABAC decoder circuitry 630 and a second input SIMD vector register 620 provides decoder context information to the CABAC decoder circuitry 630. Both the SIMD vector registers 610 and 620 have the same data format of outbit, outdata, handler, range, MPS, state, bypass, bits left, and value. However, different portions of this data are used from different ones of the input SIMD vector registers 610 and 620. For example, from the bit stream state input SIMD vector register 610, only the handler, range, bits left, and value data fields are utilized by the CABAC decoder circuitry 630. Meanwhile, from the decoder context input SIMD vector register 620, only the MPS, state, and bypass fields are utilized by the CABAC decoder circuitry 630.

The data from these respective fields is input to the CABAC decoder circuitry 630 which performs the operations listed in the example shown in FIGS. 5A and 5B but using circuitry logic rather than software operations. The manner by which the circuitry shown in FIG. 6 operates will be apparent to those of ordinary skill in the art in view of the depiction in FIG. 6 and thus, a more detailed explanation of the functioning of every circuit element will not be provided herein.

Of particular note, however, is the fact that the CABAC decoder circuitry 630 generates output values that are stored in a result SIMD vector register 640 that has the same data format as the input SIMD vector registers 610 and 620. As shown in FIG. 6, this data format includes a first vector slot (e.g., slot 0) that comprises the result bit 650 which itself is comprised of the resulting outbit and outdata values, a second slot (e.g., slot 1) that comprises the updated bit stream state 660 which is itself comprised of the handler and updated range field values, a third slot (e.g., slot 2) that comprises the updated bit stream context data 670 which itself is comprised of an updated MPS, state, and bypass field values, and a fourth slot (e.g., slot 3) that comprises the updated stream data 680 which is itself comprised of updated bits left field and value field values. Thus, the CABAC decoder circuitry 630 takes portions of information from the input SIMD vector registers 610 and 620, i.e. the bit stream state information from SIMD vector register 610 and the decoder context information from SIMD vector register 620, and updates this information and combines it into a result vector that is stored in a result SIMD vector register 630 that has the same data format as the two input SIMD vector registers 610 and 620. The result SIMD vector register 630 may then be used as the decoder context input SIMD vector register 620 during a subsequent iteration through the CABAC decoder circuitry 630.

Thus, the mechanisms of the illustrative embodiments provide a CABAC decoder mechanism that can be used with general purpose SIMD vector registers of a SIMD computing system rather than having to have special purpose registers in a hardware based CABAC decoder. As a result, the number of registers that may be used with CABAC decoding is not fixed by the hardware CABAC decoder, but is more variable using the general purpose SIMD vector registers of the computing device receiving the video stream. A new special and simplified decode operation is provided that may be executed in the SIMD computing device itself using the processing pipeline of the SIMD computing device rather than having to have a separate dedicated hardware device for CABAC decoding. This also avoids the variable latency of such dedicated hardware CABAC decoders. Moreover, because of the added versatility of using the existing pipeline structures of the computing device and the general purpose registers, the mechanisms of the illustrative embodiments allow for parallel decoding of multiple streams, as well as intermixing of the decoding of multiple streams, at substantially a same time.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing decoding of context-adaptive binary arithmetic coding (CABAC) encoded data, comprising:
   receiving, in a first single instruction multiple data (SIMD) vector register of the data processing system, CABAC encoded data of a bit stream, wherein the CABAC encoded data comprises a value to be decoded and bit stream state information, wherein the CABAC encoded data of the bit stream is retrieved from a bit stream buffer, and wherein the method further comprises:
      generating, in response to an amount of bit stream data in the bit stream buffer falling below a threshold, an interrupt to a bit stream service handler for loading a next portion of the bit stream into the bit stream buffer;
   receiving, in a second SIMD vector register of the data processing system, CABAC decoder context information;
   processing, by a processor, the value, the bit stream state information, and the CABAC decoder context information in a non-recursive manner to generate a decoded value, updated bit stream state information, and updated CABAC decoder context information;
   storing, in a third SIMD vector register, a result vector that combines the decoded value, updated bit stream state information, and updated CABAC decoder context information; and
   using the decoded value to generate a video output on the data processing system.

2. The method of claim 1, wherein the first SIMD vector register stores the CABAC encoded data of the bit stream using a same data format in the first SIMD vector register as a data format of the CABAC decoder context information stored in the second SIMD vector register.

3. The method of claim 2, wherein the result vector stored in the third SIMD vector register has a same data format as the CABAC encoded data of the bit stream stored in the first SIMD vector register and the CABAC decoder context information stored in the second SIMD vector register.

4. The method of claim 1, wherein the result vector in the third SIMD vector register is provided as at least a portion of the CABAC decoder context information in the second SIMD vector register for a next iteration of the method.

5. The method of claim 1, wherein the first, second, and third SIMD vector registers are general purpose registers of the data processing system.

6. The method of claim 1, wherein the method is implemented using a pipeline-able decode instruction.

7. The method of claim 1, wherein the method is iterated, in the data processing system, for a plurality of different bit streams, and wherein each iteration of the method is executed in parallel in the data processing system at substantially a same time.

8. A data processing system, comprising:
   a processor; and
   a memory coupled to the processor, wherein the memory comprises instructions which, when executed by the processor, cause the processor to perform a context-adaptive binary arithmetic coding (CABAC) decode operation by:
      receiving, in a first single instruction multiple data (SIMD) vector register of the processor, CABAC encoded data of a bit stream, wherein the CABAC encoded data comprises a value to be decoded and bit stream state information, wherein CABAC encoded data of the bit stream is retrieved from a bit stream buffer, and wherein the CABAC decode operation is further performed by:
         generating, in response to an amount of bit stream data in the bit stream buffer falling below a threshold, an interrupt to a bit stream service handler for loading a next portion of the bit stream into the bit stream buffer;
      receiving, in a second SIMD vector register of the processor, CABAC decoder context information;
      processing the value, the bit stream state information, and the CABAC decoder context information in a non-recursive manner to generate a decoded value, updated bit stream state information, and updated CABAC decoder context information;
      storing, in a third SIMD vector register of the processor, a result vector that combines the decoded value, updated bit stream state information, and updated CABAC decoder context information; and
      using the decoded value to generate a video output on the data processing system.

9. The system of claim 8, wherein the first SIMD vector register stores the CABAC encoded data of the bit stream using a same data format in the first SIMD vector register as a data format of the CABAC decoder context information stored in the second SIMD vector register.

10. The system of claim 9, wherein the result vector stored in the third SIMD vector register has a same data format as the CABAC encoded data of the bit stream stored in the first SIMD vector register and the CABAC decoder context information stored in the second SIMD vector register.

11. The system of claim 8, wherein the result vector in the third SIMD vector register is provided as at least a portion of the CABAC decoder context information in the second SIMD vector register for a next iteration of the method.

12. The system of claim 8, wherein the first, second, and third SIMD vector registers are general purpose registers of the data processing system.

13. The system of claim 8, wherein the CABAC decode operation is implemented using a pipeline-able decode instruction.

14. The system of claim 8, wherein the CABAC decode operation is iterated, in the data processing system, for a plurality of different bit streams, and wherein each iteration of the CABAC decode operation is executed in parallel in the data processing system at substantially a same time.

15. A computer program product comprising a non-transitory computer readable storage medium having a computer readable program stored therein, wherein the computer readable program, when executed on a computing device, causes the computing device to perform a context-adaptive binary arithmetic coding (CABAC) decode operation by:
- receiving, in a first single instruction multiple data (SIMD) vector register of the computing device, CABAC encoded data of a bit stream, wherein the CABAC encoded data comprises a value to be decoded and bit stream state information, wherein CABAC encoded data of the bit stream is retrieved from a bit stream buffer, and wherein the CABAC decode operation is further performed by:
  - generating, in response to an amount of bit stream data in the bit stream buffer falling below a threshold, an interrupt to a bit stream service handler for loading a next portion of the bit stream into the bit stream buffer;
- receiving, in a second SIMD vector register of the computing device, CABAC decoder context information;
- processing the value, the bit stream state information, and the CABAC decoder context information in a non-recursive manner to generate a decoded value, updated bit stream state information, and updated CABAC decoder context information;
- storing, in a third SIMD vector register of the computing device, a result vector that combines the decoded value, updated bit stream state information, and updated CABAC decoder context information; and
- using the decoded value to generate a video output on the computing device.

16. The computer program product of claim 15, wherein the first SIMD vector register stores the CABAL encoded data of the bit stream using a same data format in the first SIMD vector register as a data format of the CABAC decoder context information stored in the second SIMD vector register.

17. The computer program product of claim 16, wherein the result vector stored in the third SIMD vector register has a same data format as the CABAC encoded data of the bit stream stored in the first SIMD vector register and the CABAC decoder context information stored in the second SIMD vector register.

18. The computer program product of claim 15, wherein the result vector in the third SIMD vector register is provided as at least a portion of the CABAC decoder context information in the second SIMD vector register for a next iteration of the method.

19. The computer program product of claim 15, wherein the first, second, and third SIMD vector registers are general purpose registers of the computing device.

20. The computer program product of claim 15, wherein the CABAC decode operation is implemented using a pipeline-able decode instruction.

21. The computer program product of claim 15, wherein the CABAC decode operation is iterated, in the computing device, for a plurality of different bit streams, and wherein each iteration of the CABAC decode operation is executed in parallel in the computing device at substantially a same time.

* * * * *